J. V. PALMER.
MACHINE FOR HANDLING TUBULAR FABRICS.
APPLICATION FILED JULY 11, 1919.
1,334,114.
Patented Mar. 16, 1920.
3 SHEETS—SHEET 1.
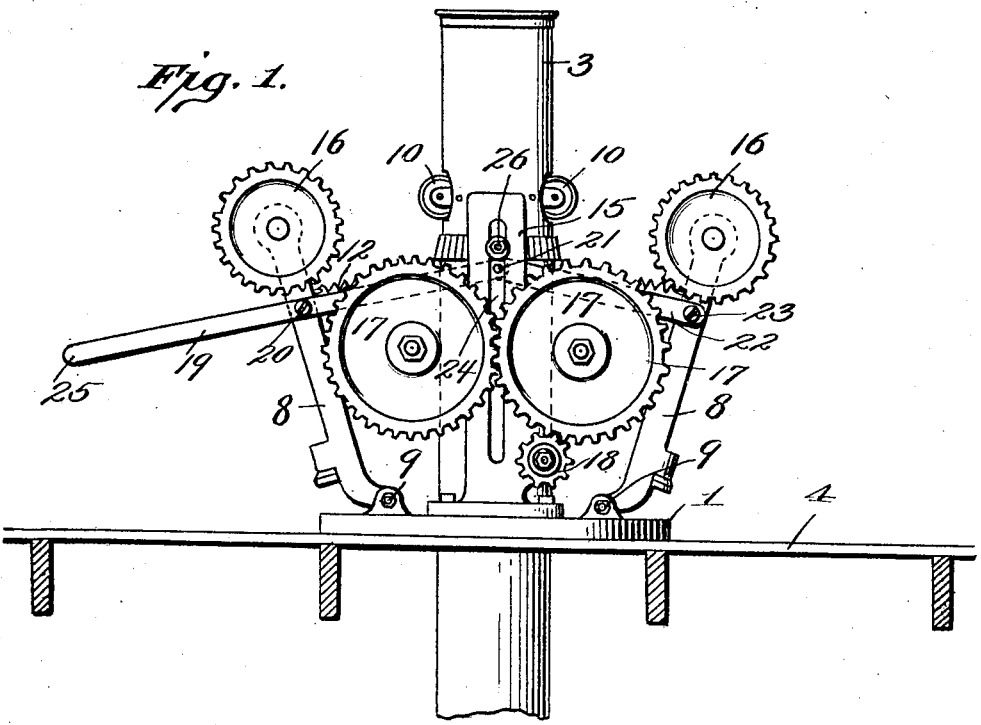
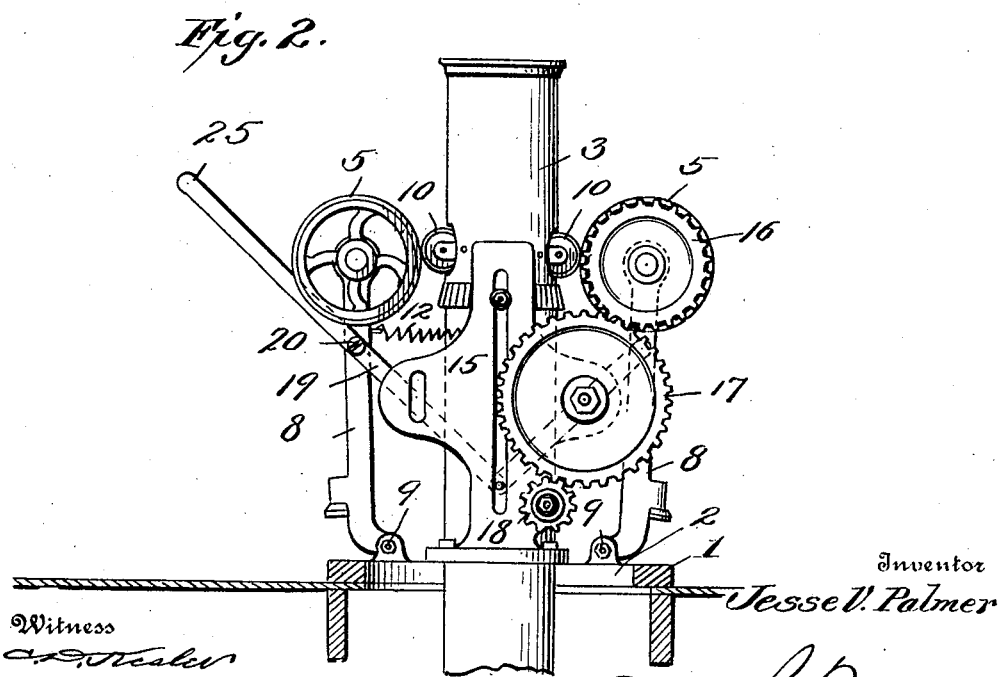

J. V. PALMER.
MACHINE FOR HANDLING TUBULAR FABRICS.
APPLICATION FILED JULY 11, 1919.
1,334,114.
Patented Mar. 16, 1920.
3 SHEETS—SHEET 2.
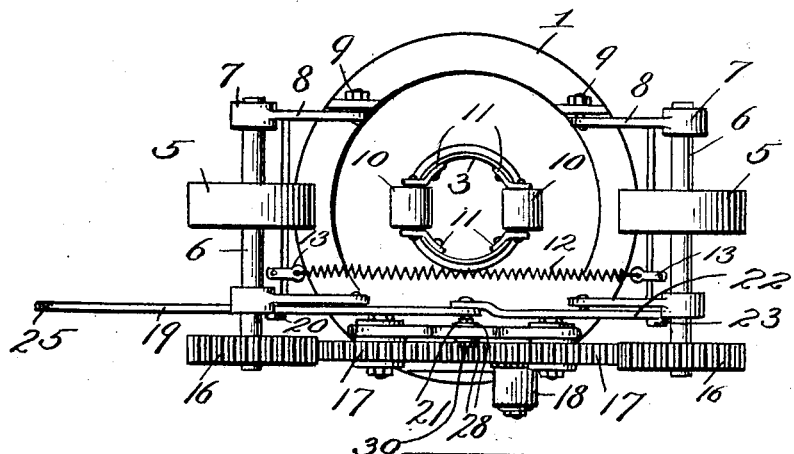
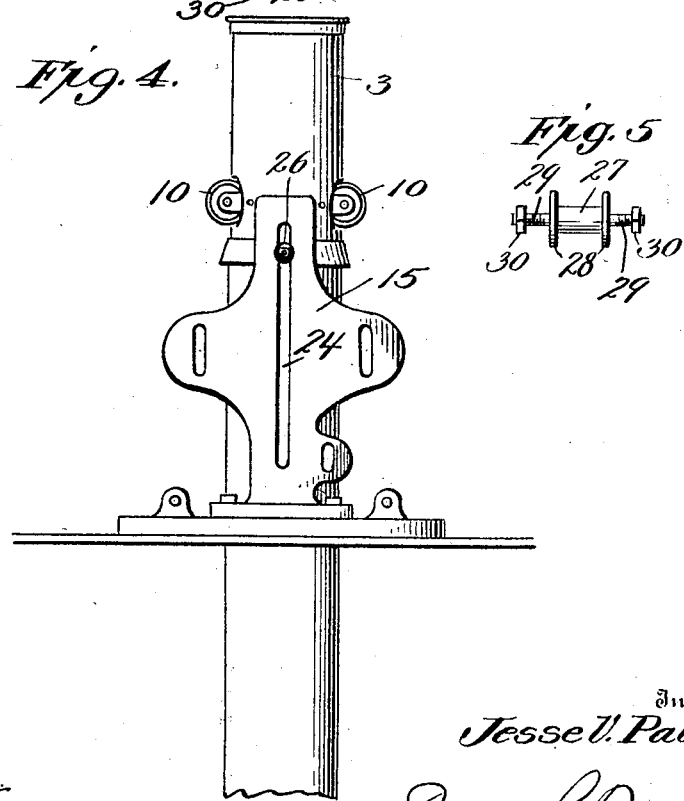
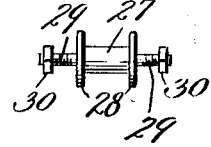
Witness
Inventor
Jesse V. Palmer
By
Attorney

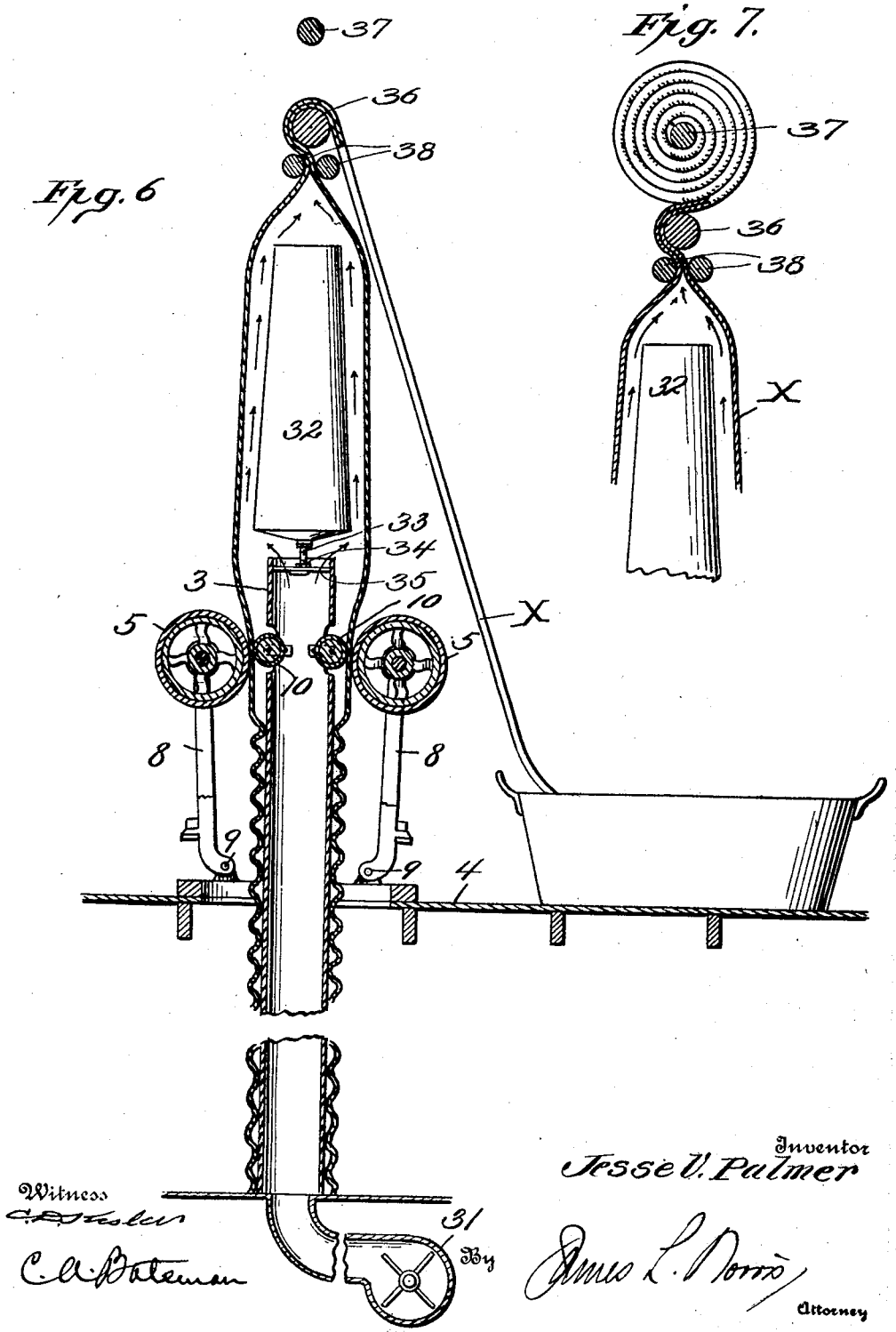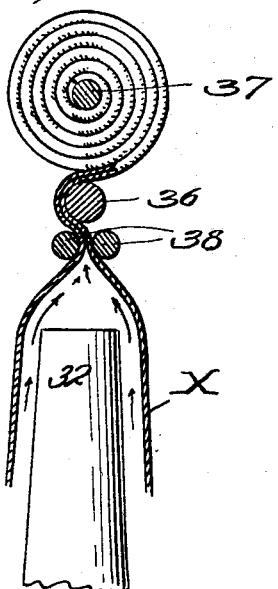

UNITED STATES PATENT OFFICE.

JESSE V. PALMER, OF GREENWICH, NEW YORK.

MACHINE FOR HANDLING TUBULAR FABRICS.

1,334,114.  Specification of Letters Patent.  Patented Mar. 16, 1920.

Application filed July 11, 1919. Serial No. 310,122.

*To all whom it may concern:*

Be it known that I, JESSE V. PALMER, a citizen of the United States, residing at Greenwich, in the county of Washington and State of New York, have invented new and useful Improvements in Machines for Handling Tubular Fabrics, of which the following is a specification.

My present invention relates to apparatus for loading tubular fabric onto a pipe or mandrel as a part of an operation of drying or otherwise treating such fabric, a machine of this same general class being shown and described in Letters Patent No. 878,995, granted February 11, 1908. Machines of the character shown and described in said patent are capable of successfully and efficiently loading tubular fabric onto a pipe or mandrel at a relatively rapid speed. It is the primary object of the present invention to provide a machine capable of successfully and efficiently loading tubular fabric onto a pipe or mandrel at a relatively slow speed in order that a drying process, such as that described in my copending application, Serial No. 284,363, may be performed in which the fabric is dried as it is fed onto the pipe or mandrel, the present invention providing a machine capable of performing such an operation in a manner that will insure advance of the fabric at a uniformly slow speed and feeding of the fabric evenly at opposite sides of the pipe or mandrel.

To these and other ends the invention consists in certain improvements, and combinations and arrangements of parts all as will be hereinafter more fully described, the features of invention being pointed out particularly in the claims at the end of the specification.

In the accompanying drawings:—

Figure 1 is a side elevation of a pipe loading machine constructed in accordance with the present invention, the feed rolls being shown in inactive position.

Fig. 2 is an elevation of the same side of the machine, the feed rolls in this figure being shown in operative position.

Fig. 3 is a top plan view of the machine shown in Figs. 1 and 2.

Fig. 4 is an elevation of the main frame and the fabric receiving pipe, the feed rolls and their driving means being removed.

Fig. 5 is a detail view of an adjustable stop which may be used to limit the movement of the feed rolls toward inactive position.

Fig. 6 is a digrammatic view showing a novel apparatus for drying tubular fabric in accordance with the present invention.

Fig. 7 is a view of the upper portion of the apparatus shown in Fig. 6, illustrating the mode of withdrawing the dried fabric from the pipe and winding the same into a roll.

Similar parts are designated by the same reference characters in the different views.

Pipe loading machines constructed in accordance with the present invention are capable of being used advantageously in loading tubular fabrics and particularly tubular knitted fabrics onto a pipe or mandrel as a part of a drying operation, or otherwise handling or treating fabric, although it is especially adapted for use in connection with a fabric drying operation such as that described in my copending application hereinbefore referred to. The preferred embodiment of the invention is shown in the drawings and will be hereinafter described in detail, but it is to be understood that the invention is not restricted to the precise construction shown, as equivalent constructions are contemplated and will be included within the scope of the claims.

In the present instance, the machine comprises preferably a base 1 which may be of any suitable shape and provided with an opening 2 through which the pipe or mandrel 3 onto which the tubular fabric is to be loaded may extend. As shown, the fabric receiving pipe or mandrel is arranged vertically or substantially so, it being advantageous to support this pipe or mandrel at its lower end upon one floor of a building and to locate the fabric feeding or loading machine on a higher floor of the building and adjacent to the upper or fabric receiving end of the pipe. As shown, the base 1 of the machine is mounted directly on the upper floor 4, although the machine may obviously be mounted in any other suitable way. The fabric feeding means comprises a pair of feed rolls 5 which are located at diametrically opposite sides of the pipe, means being provided for holding the feed rolls with a yielding pressure against the tubular fabric at opposite sides of the pipe, and means being also provided for driving or rotating the feed rolls slowly and at an equal peripheral speed. Preferably, and as shown, the feed rolls are mounted on and fixed to shafts 6, these shafts being journaled in suitable bearings 7 in the upper portions of frames 8. The frames 8 are pivoted at 9 to the base 1, the axes of the pivots 9 for the two frames being parallel and the frames being capable of swinging about their respective axes to carry the corresponding feed rolls to and from operative position. The pressure exerted upon the fabric by the feed rolls could be sustained directly by the respective sides of the pipe or mandrel. It is preferable, however, to provide a pair of idler or anti-friction rollers 10 to sustain the pressure exerted upon the fabric by the feed rolls, these idler rollers as shown being suitably journaled on parallel fixed axes and supported by suitable brackets 11 fastened within the pipe. Means is provided for holding the feed rolls with a yielding pressure against the opposite sides of the tubular fabric as the latter passes over the upper end of the mandrel and over the idler rolls 10. As shown, a spring 12 is employed for this purpose, the outer ends of the spring being attached at 13 to the respective frames 8 and the spring being stretched between the said frames. This spring is a tension spring and it acts to draw the feed rolls toward one another and during the fabric feeding operation, it serves to hold the feed rolls with a yielding pressure against the opposite sides of the fabric.

The means provided by the present invention for driving the revolving feed rolls slowly and at an equal peripheral speed comprises preferably toothed or spur gears 16 fixed on the respective feed roll shafts 6, a pair of toothed or spur drive gears 17 and a driving pinion 18. The drive gears 17 are mounted on the stationary upright 15, these gears being preferably of equal diameter and intermeshed one with the other. The pinion 18 is mounted also on the stationary upright 15 and it meshes with one of the drive gears 17. The pinion 18 may receive power or motion from a countershaft or the like through a belt drive or its equivalent. The diameters of the gears 16 and 17 and the relative locations of the axes of these gears and axes 9 of the swinging frames are such that when the feed rolls are brought toward one another and into operative engagement with the fabric, the gears 16 on the feed roll shafts mesh with and receive motion in relatively opposite directions from the respective drive gears 17; and when the feed rolls are swung apart or separated from the fabric for a sufficient distance, the gears 16 on the feed roll shafts are disengaged from the driving gears 17. As a consequence, the act of bringing the feed rolls into coöperative relation with the fabric automatically sets the feed rolls into operation and the act of throwing the feed rolls into inactive relation relatively to the fabric automatically discontinues the driving of the feed rolls. Different means may be provided for setting the feed rolls into operative and inoperative relations with the fabric. Preferably, and as shown, a lever 19 is provided for this purpose, it being pivoted intermediately at 20 to one of the swinging frames 9, its inner end being connected to a bolt or pin 21 and a link 22 is pivotally connected at 23 to the other swinging frame and its opposite or inner end is connected to the pin or bolt 21. The pin or bolt 21 is slidable vertically or longitudinally in a guiding slot 24 which is formed in the standard 15, it thus acting to maintain the feed rolls equidistantly at opposite sides of the pipe or mandrel. Relative approaching and separating movements of the swinging frames are effected by the lever 19 and the link 22 acting as a toggle, Fig. 1 showing these parts in the positions which they occupy when the feed rolls are separated and Fig. 2 showing these parts in the positions which they occupy when the feed rolls are in operative relation with the fabric. The lever 19 has an extended outer end 25 which provides a handle by means of which the lever is operated. It may be desirable to provide an adjustable stop to limit the relative separating movement between the feed rolls. The stop 26 shown for this purpose in the present instance comprises a sleeve 27 which fits in the slot 24, washers 28 to overlap the slot 24, and to engage the opposite faces of the upright 15, a bolt 29 to extend through the slot and clamping nuts 30 to clamp the washers 28 firmly against the opposite faces of the upright.

Proper meshing of the gears may be provided for by fitting the bearings for the gears in vertical slots in the upright 15 as shown.

Preferably, the feed rolls are of equal diameter, as shown, and they are revolved at equal speed by the driving means which is positive in its action, in consequence of which equality in the peripheral speed of the feed rolls is insured. This is of particular importance where the fabric is loaded onto the pipe or mandrel at a sufficiently slow speed as to enable drying of the fabric while it is being loaded onto the pipe as described in my copending application referred to, the machine of the present invention insuring feeding of the fabric evenly at opposite sides of the pipe owing to the equal peripheral speed of the feed rolls. Sufficiently uniform rate of movement of the fabric may be obtained by driving the pinion from a countershaft, line shaft or other suitable source of power.

The present invention also provides novel apparatus for drying tubular fabric by the method described in my copending application, Serial No. 284,363, filed March 22, 1919, such apparatus preferably employing the fabric feeding means as hereinbefore described, or its equivalent for loading the tubular fabric upon the pipe while the drying operation progresses. As shown in Figs. 6 and 7, this drying apparatus employs the pipe 3 and the fabric feeding means having the feeding rolls 5, and in addition thereto, an apparatus 31 is connected to the lower end of the pipe for inducing a blast of hot air through the pipe. A hot-air deflector 32 which is preferably hollow and in the form substantially of a truncated cone with its smaller end uppermost is adapted to be mounted on the upper end of the pipe by a hook-like stem 33, and clamping nut 34 engaging a cross bar 35 fixed in the upper open end of the pipe, the base or lower end of the deflector preferably having a diameter somewhat greater than the diameter of the pipe. A roller 36 is adapted to be driven to wind the dried fabric into a roll on the spool 37 and a pair of guide rollers 38 are also preferably provided.

In operating an apparatus such as that just described for drying tubular fabric, the fabric is first washed preferably while it is in a roll and the water is extracted from it in any suitable way, after which the fabric, which still contains a considerable amount of moisture, is subject to the drying treatment by feeding the tubular fabric upon the pipe while the hot-air blast is forced through the pipe and into the interior of the tubular web of fabric passing onto the pipe at such a rate of speed that the fabric becomes dried by the hot-air blast before the fabric passes onto the pipe. The feed rolls should be driven at such a speed that it will require an hour or longer to feed each roll of fabric upon the pipe. As shown, the fabric X is drawn from a basket or other suitable receptacle up over the roller 26, which at such time is free to turn idly, thence down between the idly turning guide rollers 38 over the hot-air deflector 32, substantially free of tension, and is fed onto the pipe by the feed rolls 5 while the hot-air blast passes upwardly within the pipe and within the tubular fabric above the pipe. The column of hot-air when it reaches the upper end of the pipe, is expanded and thrown outwardly against the surrounding wall formed by the tubular fabric, the column of hot air then assuming an annular form, the hot air filling the fabric and causing it to become inflated or spread out sufficiently to remove folds, wrinkles or creases therefrom, and the relatively large area of the fabric thus brought into contact with the hot air causes a progressive and thorough drying thereof. The hot air eventually escapes from the interior of the tubular fabric through the meshes of the fabric. By thus drying the fabric while the same is being loaded upon the pipe, the drying is effected while the fabric is collapsed or loose and hence free of tension, either longitudinally or transversely, in consequence of which the fabric will not become stretched and will retain its elasticity. When the loading of the fabric onto the pipe and hence the drying of the fabric has been completed, the feed rolls 5 are retracted and the dried fabric may then be drawn off the pipe over the deflector 32 and wound onto a roll and the spool 37 by the roller 36 which is then suitably driven on which the fabric roll rests, the fabric being drawn, during this operation, between the guide rollers 38, or the dried fabric may be placed in a suitable receptacle. By drawing the fabric between the guide rollers 38 while the fabric is inflated or spread out by the hot-air blast, the fabric is brought into a smooth flat web of the proper width and free of creases or wrinkles. The dried fabric is then ready to be cut up and made into garments.

What is claimed is:—

1. Apparatus for loading tubular fabric onto a pipe or mandrel at a sufficiently slow speed to permit drying of the fabric during such loading, comprising coöperative feed rolls located at opposite sides of the pipe to coöperate with a tubular fabric thereon, and means for driving said feed rolls positively at equal peripheral speed to advance the fabric evenly at opposite sides of the pipe and at the said relatively slow speed.

2. Apparatus for loading tubular fabric onto a pipe or mandrel at a speed which will permit drying of such fabric during its loading onto the pipe, comprising a pair of feed rolls arranged at opposite sides of the pipe to coöperate with a tubular fabric thereon, and gearing for driving said feed rolls at equal peripheral speed to feed the portions of the fabric at opposite sides of the pipe evenly in a direction longitudinally of the pipe and at the said speed.

3. Apparatus for loading tubular fabric onto a pipe or mandrel at a relatively slow speed which will permit drying of such fabric during its loading upon the pipe, comprising feed rolls arranged at opposite sides of the pipe to coöperate with a tubular fabric thereon, gears connected to the respective feed rolls, and intermeshed driving gears adapted to coöperate with the gears first mentioned to drive them and the feed rolls connected thereto at uniform peripheral speed to advance the fabric evenly at opposite sides of the pipe and at the said relatively slow speed.

4. Apparatus for loading tubular fabric onto a pipe or mandrel, comprising a pair of feed rolls mounted to move relatively to coöperate with opposite sides of a tubular fabric on the pipe, means for moving the feed rolls into such operative position and for also moving the feed rolls apart to render them inactive, a guide coöperative with said means and serving to maintain the feed rolls at proper distances at opposite sides of the pipe, a stop coöperative with said guide to determine and limit the movement of the feed rolls in a direction away from the pipe, and driving means for the feed rolls.

5. Apparatus for loading tubular fabric onto a pipe or mandrel, comprising a pair of feed rolls relatively movable toward and from the pipe to render them operative and inoperative respectively relatively to a tubular fabric thereon, gears connected to the respective feed rolls and movable therewith, relatively fixed interconnected drive gears, and means whereby the gears connected to the feed rolls are brought into operative engagement with the respective drive gears when the feed rolls are moved into operative position and for disengaging said gears when the feed rolls are moved into inoperative position.

6. The combination with a pipe or mandrel adapted to receive a tubular fabric longitudinally thereon, of a pair of frames pivoted at opposite sides thereof, feed rolls mounted on shafts journaled in the respective frames, the frames being capable of swinging to carry the feed rolls to and from operative positions at opposite sides of the pipe, gears on the respective feed roll shafts, and a pair of relatively fixed intermeshed drive gears, the said gears being so proportioned and located that the gears on the feed roll shafts will be operatively engaged with the respective drive gears when the feed rolls are carried by said frames into operative position, and such gears will be disengaged when the feed rolls are carried out of operative position.

7. Apparatus for treating moist tubular fabric comprising a pipe, means for feeding the fabric onto the pipe at a uniform rate of speed, means for inducing a hot-air blast through the pipe and into the interior of the portion of the tubular fabric approaching the pipe.

8. Apparatus for drying moist tubular fabric comprising a pipe, means for introducing a hot-air blast at one end of the pipe, a hot-air deflector at the opposite end of the pipe, and means for feeding the moist tubular fabric over said deflector and onto the pipe while said hot-air blast is induced through the pipe.

9. Apparatus for drying moist tubular fabric comprising a pipe, means for introducing a hot-air blast at one end thereof, a hot-air deflector for diverting the hot-air blast outwardly into the form of an annular column at the opposite end of the pipe, means for feeding the moist tubular fabric over said deflector and onto the pipe while said hot-air blast is induced through the pipe, and means including coöperative guide rollers located adjacent to the deflector for withdrawing the dried fabric from the pipe and over the deflector and for flattening the tubular fabric into a web.

In testimony whereof I have hereunto set my hand in presence of two subscribing witnesses.

JESSE V. PALMER

Witnesses:
C. A. BATEMAN,
CHAS. S. HYER.